(12) United States Patent
Kawano et al.

(10) Patent No.: US 8,878,781 B2
(45) Date of Patent: Nov. 4, 2014

(54) INPUT DEVICE AND ELECTRONIC APPARATUS

(71) Applicant: Alps Electric Co., Ltd., Tokyo (JP)

(72) Inventors: Toshio Kawano, Miyagi-ken (JP); Kazuhito Oshita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 258 days.

(21) Appl. No.: 13/659,835

(22) Filed: Oct. 24, 2012

(65) Prior Publication Data

US 2013/0169600 A1 Jul. 4, 2013

(30) Foreign Application Priority Data

Dec. 28, 2011 (JP) ................... 2011-289390

(51) Int. Cl.
*G09G 5/00* (2006.01)
*G06F 3/041* (2006.01)
*G06F 3/0488* (2013.01)
*G06F 3/0485* (2013.01)

(52) U.S. Cl.
CPC .......... *G06F 3/0418* (2013.01); *G06F 3/04855* (2013.01); *G06F 3/0488* (2013.01); *G06F 3/0416* (2013.01)
USPC ............................ 345/156; 345/173; 345/178

(58) Field of Classification Search
None
See application file for complete search history.

(56) References Cited

U.S. PATENT DOCUMENTS 6,346,935 B1   2/2002   Nakajima et al.

FOREIGN PATENT DOCUMENTS

JP   2000-330711   11/2000

*Primary Examiner* — Jason Olson
(74) *Attorney, Agent, or Firm* — Beyer Law Group LLP

(57) ABSTRACT

An input device includes an input operation surface that includes one or more specific regions, can be operated by an indicator, and is provided separately from a display screen; a detection unit that detects an operation position of the indicator; a region creating unit that creates a discrimination region while using the operation position as a base point when it is detected that the operation position of the indicator is positioned in the specific region; and a discrimination unit that uses a fact that a moving direction of the indicator from the base point, when the indicator moves within the discrimination region, is positioned on at least a line, which traverses the specific region substantially in parallel or obliquely, as conditions that allow a predetermined function to be performed on the display screen. When the discrimination unit discriminates that the conditions are satisfied, a performance signal is output.

27 Claims, 13 Drawing Sheets

INPUT DEVICE AND ELECTRONIC APPARATUS

CLAIM OF PRIORITY

This application claims benefit of Japanese Patent Application No. 2011-289390 filed on Dec. 28, 2011, which is hereby incorporated by reference.

BACKGROUND OF THE INVENTION

1. Field of the Invention

The present invention relates to an input device that includes a flat input pad to which an input operation can be performed by an indicator such as a finger, and more particularly, to operability that is required to perform a predetermined function on a display screen.

2. Description of the Related Art

In recent years, there have been many plane coordinates input devices, which can recognize an operation performed by an indicator such as a finger, such as flat pointing devices provided in personal computers. The pointing device is adapted to be capable of not only moving a cursor on a display screen but also performing a specific function other than the movement of the cursor by performing an operation on, for example, a flat input pad.

For example, Japanese Unexamined Patent Application Publication No. 2000-330711 discloses a technique where a plurality of specific regions are provided at corners of a plane coordinates input device and a specific function is performed by continuous contact between a finger and adjacent specific regions among the plurality of specific regions.

However, a finger is operated from a predetermined first specific region to the next specific region (second specific region) in Japanese Unexamined Patent Application Publication No. 2000-330711. Accordingly, when a finger slides from the vicinity of an end of the first specific region and moves toward the second specific region, for example, in a case where a finger comes into contact with the vicinity of an end of the first specific region without coming into contact with the central portion of the first specific region, the moving direction of the finger is slightly inclined and deviates from the second specific region. For this reason, it is considered that there is also a case where an operation cannot be appropriately and easily performed.

Further, since the first specific region is provided at the corner of the input pad, it is difficult to operate the first specific region by a finger. Furthermore, even though the first specific region can be operated, the above-mentioned problem is apt to occur.

Moreover, there are actually various kinds of operation in Japanese Unexamined Patent Application Publication No. 2000-330711 as shown in Table 2, Table 7, and the like of Japanese Unexamined Patent Application Publication No. 2000-330711, and the various kinds of operation are complicated.

SUMMARY OF THE INVENTION

Accordingly, the present invention provides an input device of which the operability required to perform a specific function on a display screen is improved as compared to the past.

According to an aspect of the invention, there is provided an input device that includes an input operation surface, a detection unit, a region creating unit, and a discrimination unit. The input operation surface includes one or more specific regions, is operated by an indicator, and is provided separately from a display screen. The detection unit detects an operation position of the indicator. The region creating unit creates a discrimination region different from the specific region while using the operation position as a base point when it is detected that the operation position of the indicator is positioned in the specific region. The discrimination unit uses a fact that a moving direction of the indicator from the base point, when the indicator moves within the discrimination region, is positioned on at least a line, which traverses the specific region substantially in parallel or obliquely, as a condition that allows a predetermined function to be performed on the display screen. When the discrimination unit discriminates that the condition is satisfied, a performance signal, which allows the predetermined function to be performed, is output from a signal generating unit.

In the aspect of the invention, the specific region is set first in the input operation surface. Then, when it is detected that the indicator is present in the specific region, the discrimination region is created while the operation position of the indicator is used as a base point.

In, for example, Japanese Unexamined Patent Application Publication No. 2000-330711, a plurality of adjacent specific regions are previously provided at four corners of the input operation surface and a predetermined function is performed according to the operation state of the indicator moving within the adjacent specific regions. In contrast to this, in the aspect of the invention, a region (discrimination region) is newly created while the operation position of the indicator entering the specific region is used as a base point. Then, when a direction where the indicator moves in the discrimination region is a direction traversing the specific region, a predetermined function is performed.

Even though the indicator operates any portion of the specific region first in the aspect of the invention, a discrimination region can be created while the operation position of the indicator is used as a base point, and a predetermined function can be performed. Accordingly, it is possible to achieve simple operability. Further, it is possible to easily adjust the size of the discrimination region and the like and to freely and easily adjust the operation sensitivity that is required to perform a predetermined function. Furthermore, in the aspect of the invention, a predetermined function is not performed even though the indicator is moved in any direction within the discrimination region. Moreover, a fact that the indicator moves in the direction traversing the specific region in parallel or obliquely has been used as a condition that allows a predetermined function to be performed on the display screen. Accordingly, it is possible to suppress a malfunction and an operator easily and intuitively performs an operation in the direction traversing the specific region. Therefore, according to the aspect of the invention, it is possible to improve operability, which is required to perform a predetermined function on the display screen, as compared to the past.

In the aspect of the invention, the input operation surface may be surrounded by a left end portion and a right end portion, which are parallel to each other, and a front end portion and a rear end portion that are orthogonal to the left end portion and the right end portion and parallel to each other; the specific region may be provided adjacent to at least one of the left end portion, the right end portion, the front end portion, and the rear end portion; and a direction traversing the specific region provided adjacent to the left end portion substantially in parallel may be a right direction, a direction traversing the specific region provided adjacent to the right end portion substantially in parallel may be a left direction, a direction traversing the specific region provided adjacent to the front end portion substantially in parallel may be a rearward direction, and a direction traversing the specific region provided adjacent to the rear end portion substantially in parallel may be a forward direction. Since the specific regions are provided along the end portions of the input operation surface as described above, it is possible to form the specific regions of which the lengths are long and an operator easily and intuitively recognizes the directions traversing the specific regions in parallel. Accordingly, it is possible to effectively improve operability.

Further, in the aspect of the invention, the shape of the discrimination region may not depend on the shape and area of the specific region. Accordingly, since it is possible to form the discrimination region with an arbitrary or predetermined area (size) regardless of the position of the base point, it is possible to obtain stable discrimination accuracy.

Furthermore, in the aspect of the invention, the discrimination region may be formed in a shape surrounding the base point.

Moreover, in the aspect of the invention, the base point may be positioned at the center of the discrimination region. It is possible to easily create the discrimination region.

Further, in the aspect of the invention, the discrimination region may be created in a circular shape. Accordingly, it is possible to easily create the discrimination region. Furthermore, it is easy to obtain a discrimination condition whether to perform a predetermined function in the discrimination unit. Alternatively, the discrimination region may be formed in a rectangular shape.

Furthermore, in the aspect of the invention, a fact that the indicator moves from the base point by a predetermined distance or more may be used as one of the conditions in the discrimination unit.

Moreover, in the aspect of the invention, time that is required to reach the predetermined distance may be used as one of the conditions in the discrimination unit.

Further, in the aspect of the invention, the moving speed of the indicator may be used as one of the conditions in the discrimination unit.

Furthermore, in the aspect of the invention, a fact that the moving direction of the indicator is within a predetermined angle 8 from a direction traversing the specific region in parallel may be used as one of the conditions in the discrimination unit.

Moreover, in the aspect of the invention, a moving distance where the indicator moves after passing through the discrimination region may be used as one of the conditions in the discrimination unit.

Further, in the aspect of the invention, the discrimination region may be divided into a plurality of small regions and a fact that the indicator further moves from a first small region in which the base point is positioned to a second small region, which is adjacent to the first small region in the direction traversing the specific region in parallel, may be used as one of the conditions in the discrimination unit.

Furthermore, in the aspect of the invention, the acceleration of the indicator may be used as one of the conditions in the discrimination unit.

It is possible to suppress a malfunction by using a plurality of conditions that allow a predetermined function to be performed as described above. Moreover, since it is possible to make a condition, which allows a predetermined function to be performed, be strict or relaxed by combining the conditions, it is possible to freely adjust operation sensitivity. Accordingly, it is possible to achieve operability suitable for an operator.

Further, in the aspect of the invention, the discrimination region may be created in a circular shape by the region creating unit. Furthermore, when a movement vector of the indicator from the base point to a moving point becoming a discrimination point is divided into a parallel vector component that traverses the specific region in parallel and a vertical vector component that is orthogonal to a parallel direction, all of the fact that the parallel vector component is larger than the vertical vector component, the fact that the moving distance of the indicator is a predetermined value or more, the fact that an angle $\theta 1$ of the movement vector from the parallel direction is within a predetermined angle $\theta$, and the time that is required for the indicator to pass through the discrimination region may be used as the conditions in the discrimination unit.

In this case, one or more of a moving distance where the indicator moves after passing through the discrimination region, the acceleration of the indicator to the moving point, and the installation area of the indicator may be further added as the conditions in the discrimination unit.

Moreover, in the aspect of the invention, the region creating unit may create the circular discrimination region having a radius $r1$ while using the base point as a center, and the fact that the moving distance of the indicator is equal to or larger than the radius $r1$ may be used as a condition in the discrimination unit.

Alternatively, in the aspect of the invention, the region creating unit may create the discrimination region divided into a plurality of small regions so that the discrimination region includes at least a first small region using the base point as a center and a second small region positioned adjacent to the first small region in a direction traversing the specific region from the base point in parallel; and the fact that a moving point of the indicator becoming a discrimination point from the base point is positioned in the second small region and the movement time that is required for the indicator to move from the base point to the moving point may be used as the conditions in the discrimination unit.

In this aspect, assuming that the width of each small region in a direction traversing the specific region in a parallel direction is denoted by $T1$ and the length of each small region in a direction orthogonal to the traversing direction is denoted by $L1$, the region creating unit may adjust the width $T1$ and the length $L1$ so that the maximum angle from the parallel direction becomes a predetermined angle $\theta$ or less when the indicator moves to the second small region from the base point positioned in the first small region.

Further, one or more of the acceleration of the indicator from the base point to the moving point, the moving distance of the indicator when the indicator further moves from the moving point, and the installation area of the indicator may be further added as the conditions in the discrimination unit.

Furthermore, in the aspect of the invention, the region creating unit may create the respective small regions in the same rectangular shape and dispose the plurality of small regions in a matrix form.

Moreover, in the aspect of the invention, at least an operation performed on a non-specific region other than the specific region of the input operation surface may be associated with a cursor displayed on the display screen.

Further, in the aspect of the invention, the performance signal may allow the predetermined function to be performed at a position, which corresponds to the specific region in which the operation position of the indicator is detected, on the display screen. Accordingly, it is easy to intuitively recognize an operation that starts a predetermined function.

Furthermore, in the aspect of the invention, after the predetermined function is performed, another function may be achieved through the detection of a fact that the indicator is positioned on the specific region.

Moreover, in the aspect of the invention, after the predetermined function is performed, another function may be achieved through the detection of a predetermined moving state of the indicator.

Further, in the aspect of the invention, the predetermined function may be to display or start a menu screen, an application, or a window on the display screen.

Furthermore, according to another aspect of the invention, there is provided an electronic apparatus including the above-mentioned input device, an apparatus main body that receives a performance signal from the input device, and a display device that includes the display screen. Accordingly, it is possible to provide an electronic apparatus that is excellent in operability required to perform a predetermined function.

According to the input device of the aspect of the invention, even though an indicator operates any portion of the specific region first, a discrimination region can be created while the operation position of the indicator is used as a base point, and a predetermined function can be performed. Accordingly, it is possible to achieve simple operability. Further, it is possible to easily adjust the size of the discrimination region and the like and to freely and easily adjust the operation sensitivity that is required to perform a predetermined function. Therefore, according to the aspect of the invention, it is possible to improve operability, which is required to perform a predetermined function, as compared to the past.

BRIEF DESCRIPTION OF THE DRAWINGS

FIG. 3A is a plan view showing a state where a finger of an operator enters a specific region of the input operation surface, and FIG. 3B is a plan view showing a state where the detection of the presence of the finger in the specific region is received and a discrimination region is created;

FIG. 6A is a plan view showing a state where a finger of an operator enters a specific region of the input operation surface, and FIG. 6B is a plan view showing a state where the detection of the presence of the finger in the specific region is received and a discrimination region is created;

DESCRIPTION OF THE PREFERRED EMBODIMENTS

Figure 1:
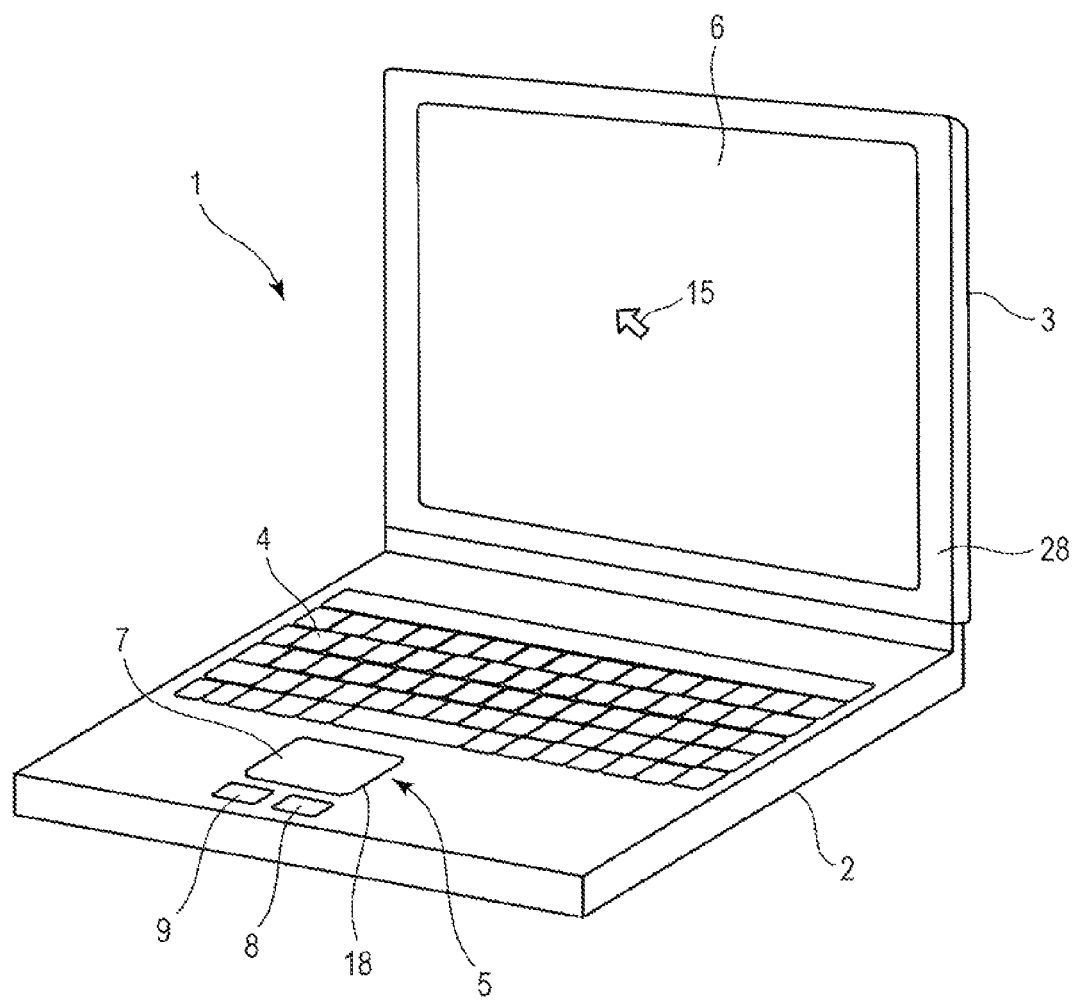
FIG. 1 is a perspective view of an electronic apparatus (notebook type personal computer) according to an embodiment.

FIG. 1 is a perspective view of a notebook type personal computer (PC) on which an input device according to an embodiment of the invention is mounted.

An apparatus main body 2 and a lid body 3 of the personal computer (electronic apparatus) 1 shown in FIG. 1 are foldably connected to each other. An operation board provided on the surface of the apparatus main body 2 is provided with a keyboard device 4, a flat input device 5, and the like. A display device 38 including a display screen 6 is provided on the near-side surface of the lid body 3.

The flat input device 5 includes a flat input pad 18, a right button 8 that is positioned on the lower right side of the input pad 18, and a left button 9 that is positioned on the lower left side of the input pad 18. Meanwhile, the right button 8 and the left button 9 form the input device 5 according to this embodiment, but are not essential members.

Figure 10:
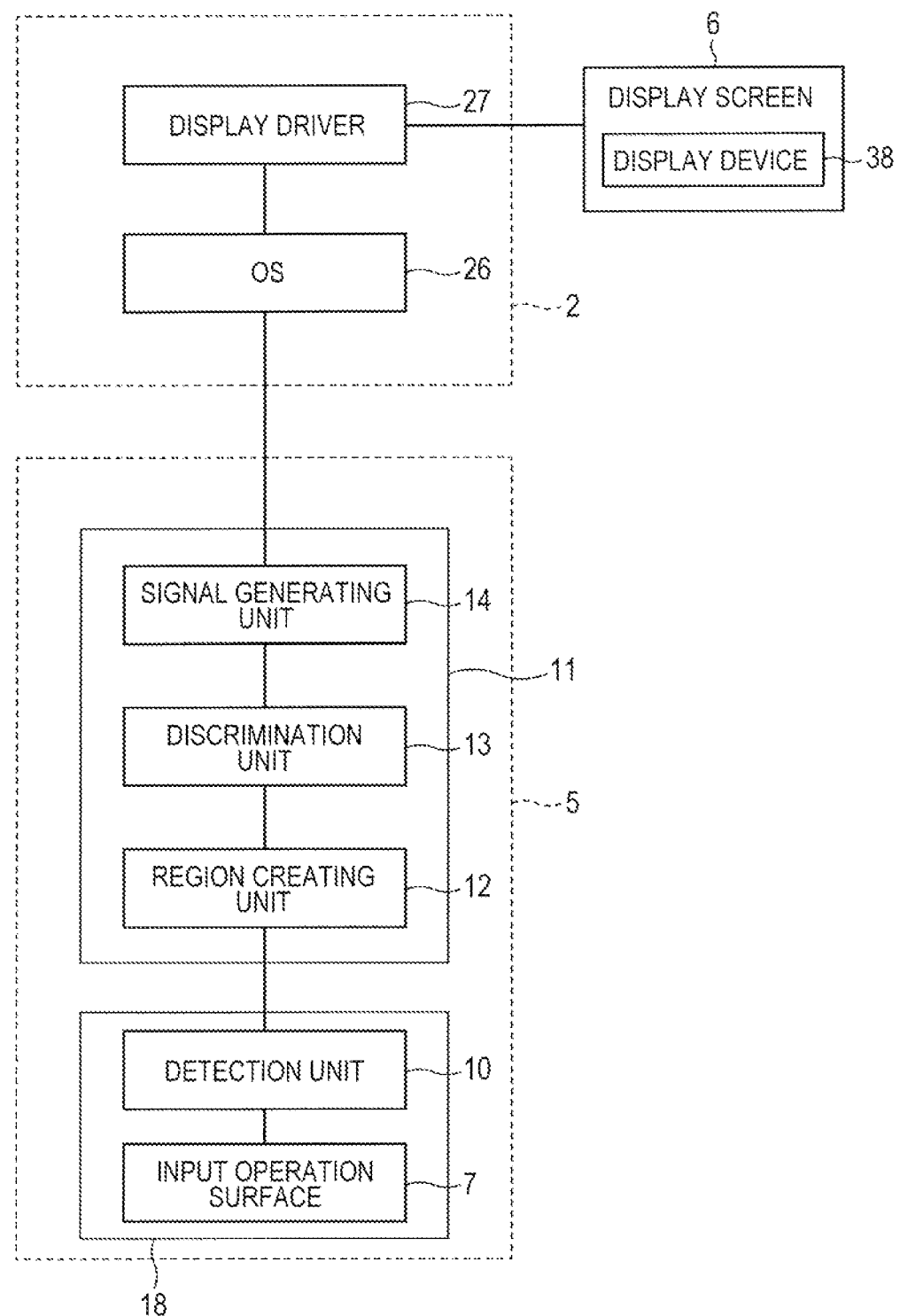
FIG. 10 is a block diagram of the electronic apparatus according to this embodiment.

As shown in FIG. 10, the input pad 18 includes an input operation surface 7 and a detection unit 10. The input pad 18 includes the detection unit 10 that can detect an operation position when an operation is performed on the input operation surface 7 by a finger (indicator). The detection unit 10 is, for example, a capacitive sensor, and can find out the plane coordinates of an operation position on the basis of the change of capacitance when the finger is operated on the input operation surface 7.

For this reason, when an operation is performed on the input operation surface 7 by the finger, a signal of the operation is sent to the apparatus main body 2. Accordingly, it is possible to move a cursor (mouse pointer) 15 on the display screen 6 of the display device while interlocking the cursor with the operation of the finger.

Figure 2:
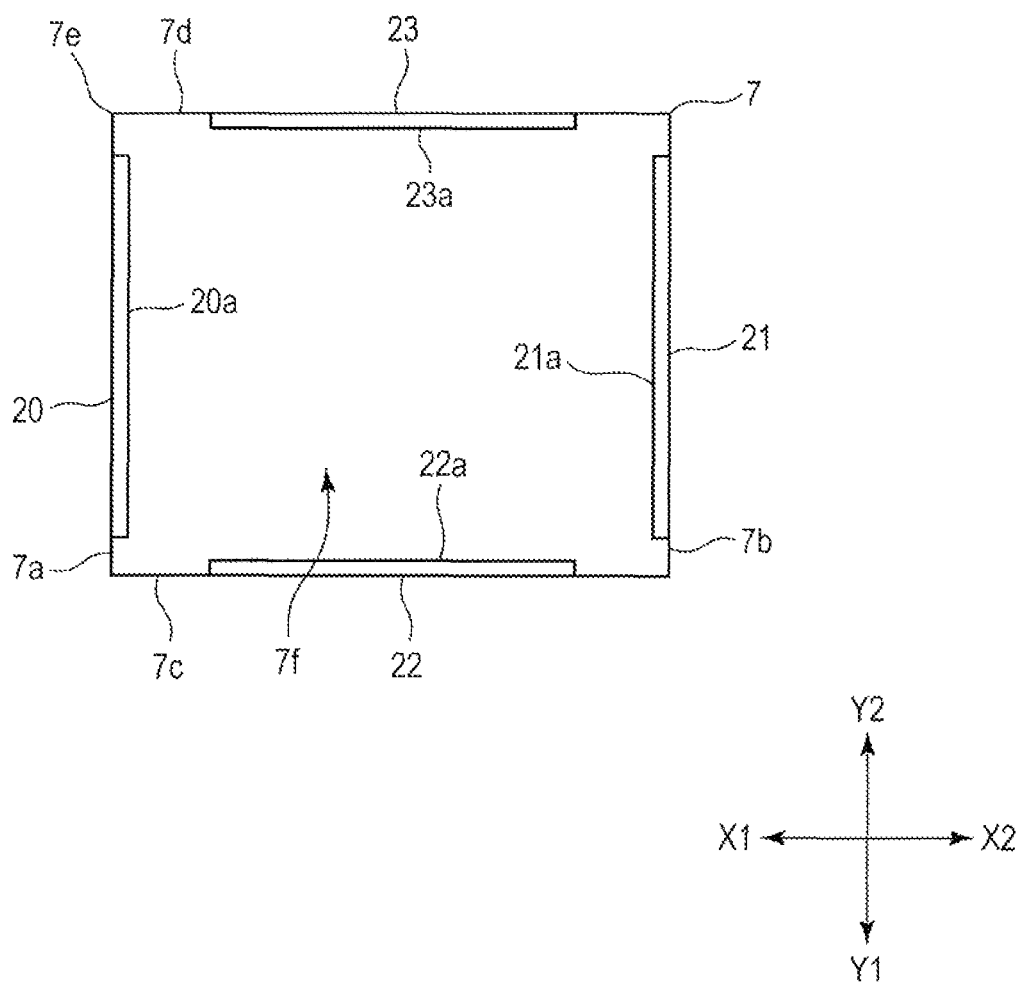
FIG. 2 is a plan view of a specific region provided on an input operation surface.

As shown in FIG. 2, single or plural specific regions 20 to 23 are set in the input operation surface 7 of this embodiment.

As shown in FIG. 2, the input operation surface 7 is surrounded by left and right end portions 7a and 7b that extend in a front-and-rear direction (Y1-Y2) and are disposed with a distance therebetween in a left-and-right direction (X1-X2), and front and rear end portions 7c and 7d that extend in the left-and-right direction (X1-X2) and are disposed with a distance therebetween in the front-and-rear direction (Y1-Y2).

Further, the specific region 20 is created in an elongated shape having a predetermined width so as to extend along the left end portion 7a in the front-and-rear direction (Y1-Y2). Furthermore, the specific region 21 is created in an elongated shape having a predetermined width so as to extend along the right end portion 7b in the front-and-rear direction (Y1-Y2). Moreover, the specific region 22 is created in an elongated shape having a predetermined width so as to extend along the front end portion 7c in the left-and-right direction (X1-X2). Further, the specific region 23 is created in an elongated shape having a predetermined width so as to extend along the rear end portion 7d in the left-and-right direction (X1-X2).

In FIG. 2, the four specific regions 20 to 23 are shown in the input operation surface 7. However, one specific region may be formed or four or more specific regions may be formed. For example, a specific region may be formed so as to extend along two end portions (the left end portion 7a and the rear end portion 7d) from the position of a left rear corner 7e of the input operation surface 7 shown in FIG. 2. Moreover, each of the specific regions 20 to 23 shown in FIG. 2 may be divided into a plurality of regions. However, it is preferable that an elongated specific region be created along any one of the left end portion 7a, the right end portion 7b, the front end portion 7c, and the rear end portion 7d as shown in this embodiment.

Figure 3A:
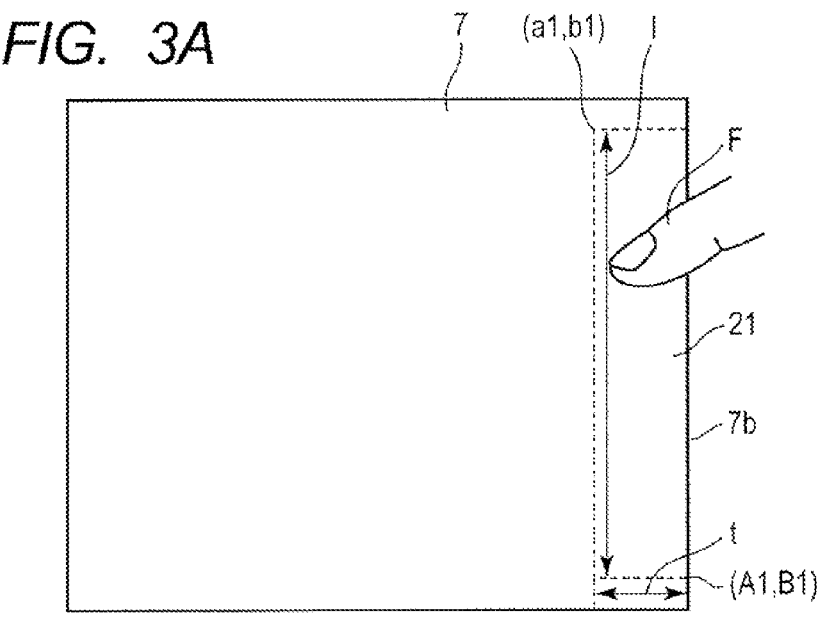
FIGS. 3A and 3B are a plan view of an input operation surface of an input device according to a first embodiment.

In FIG. 3A, the specific region 21 adjacent to the right end portion 7b is formed in the input operation surface 7. The range of the specific region 21 is determined by the coordinates (a1, b1) and (A1, B1) of two apexes (corners) that are positioned on a diagonal line. For example, the width t and length l of the specific region 21 may be arbitrarily determined in this embodiment. Here, the width t means the length of a shorter side when the specific region has an elongated shape as shown in FIGS. 2 and 3A. Meanwhile, the width direction of the specific regions 20 and 21, which are adjacent to the left and right end portions 7a and 7b or close to the left and right end portions 7a and 7b as shown in FIG. 2, (where a gap is formed between the respective end portions 7a and 7b) is the left-and-right direction (X1-X2) regardless of the shape, size, or the like of the specific region. Further, the width direction of the specific regions 22 and 23, which are adjacent to the front and rear end portions 7c and 7d or close to the front and rear end portions 7c and 7d (where a gap is formed between the respective end portions 7c and 7d), is the front-and-rear direction (Y1-Y2).

The shape of the specific region is not limited in this embodiment, but it is preferable that the shape of the specific region be an elongated rectangular shape as shown in FIG. 2, 3, or the like. Furthermore, the position of the specific region in the input operation surface 7 is also not limited, but it is preferable that the specific region be adjacent or close to each side (each end portion) of the input operation surface 7 as shown in FIG. 2, 3, or the like. Accordingly, it is possible to improve operability.

Since the specific regions 20 to 23 are disposed as shown in FIG. 2, a central region 7f of the input operation surface 7 becomes a non-specific region. When an operation is performed on the central region 7f (non-specific region) by the finger, the cursor 15 shown in FIG. 1 can be moved in an operating direction.

A direction traversing the specific region in parallel will be described subsequently. Traversing in parallel means a direction that is orthogonal to boundary lines 20a to 23a between the non-specific region and the respective specific regions and is directed to the inside of the input operation surface 7. Meanwhile, when the boundary line is not parallel to the left-and-right direction (X1-X2) or the front-and-rear direction (Y1-Y2) since the specific region is formed in a polygonal shape other than a rectangular shape or the outer periphery of the specific region is formed in a curved shape or the like, the direction traversing the specific region in parallel is a direction that is parallel to the left-and-right direction (X1-X2) or the front-and-rear direction (Y1-Y2) from the center (the center of gravity) of the specific region and is directed to the inside of the input operation surface 7.

A direction traversing the specific region 20, which is shown in FIG. 2, substantially in parallel is a right direction (X2), a direction traversing the specific region 21 substantially in parallel is a left direction (X1), a direction traversing the specific region 22 substantially in parallel is a rearward direction (Y2), and a direction traversing the specific region 23 substantially in parallel is a forward direction (Y1). "Substantially" is a concept that allows a minute deviation including an error. For example, even though the above-mentioned boundary line slightly deviates from the left-and-right direction (X1-X2) or the front-and-rear direction (Y1-Y2), the "direction traversing in parallel" can be defined as the left-and-right direction (X1-X2) or the front-and-rear direction (Y1-Y2).

Each of the specific regions 20 to 22 can be created by a region creating unit (region creating means) 12 of a controller 11 shown in FIG. 10. In this case, each of the specific regions 20 to 22 may be adapted to be predetermined at the time of manufacture and may be adapted for an operator, which purchases the personal computer, to be capable of arbitrarily selecting the shape, size, and position thereof.

Now, it is assumed that a finger F (indicator) is present in the specific region 21 as shown in FIG. 3A. In this case, an operation position F1 of the finger F can be found out by the detection unit 10 shown in FIG. 10.

Figure 3B:
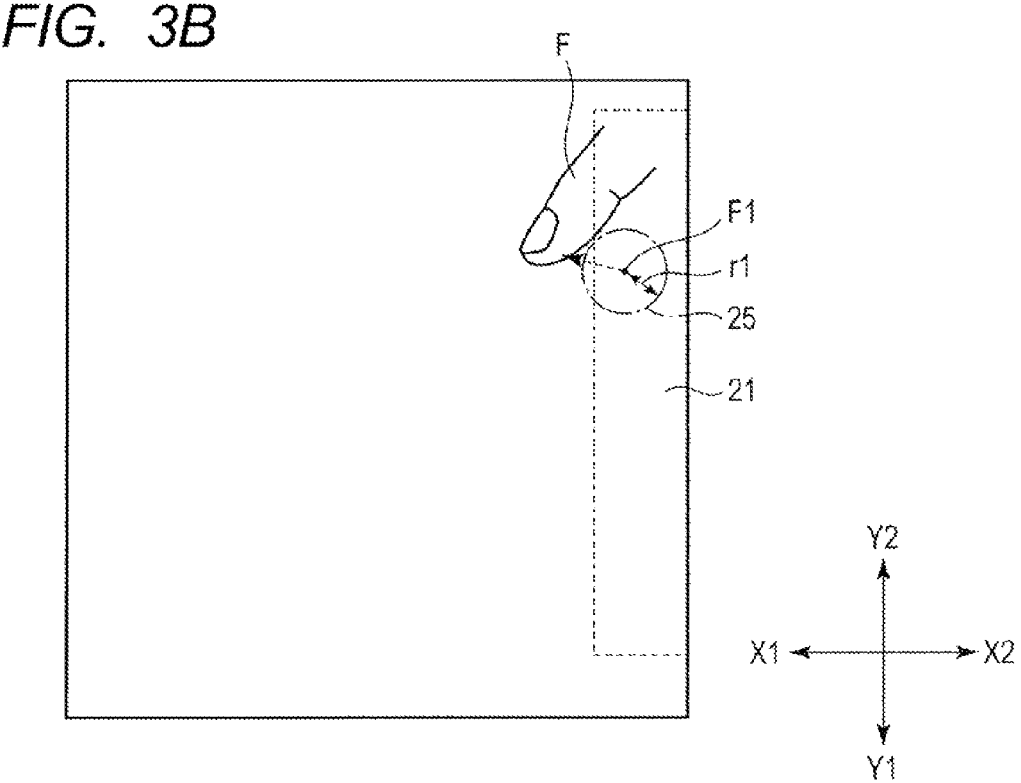

In this embodiment, as shown in FIG. 3B, a discrimination region 25 is created by the region creating unit 12 of FIG. 10 while the operation position F1 of the finger F is used as a base point (hereinafter, referred to as a base point F1).

In FIG. 3B, the discrimination region 25 is created in a circular shape. The base point F1 is present at the center of the discrimination region 25. Accordingly, the discrimination region 25 is formed so as to have a radius r1 from the center (base point F1) of the discrimination region 25 (also see FIG. 4).

It is preferable that the magnitude of the radius r1 can be arbitrarily selected by an operator. The magnitude of the radius r1 is related with the sensitivity that allows a predetermined function to be described below to be performed, and allows the sensitivity to freely change so that an operator easily uses the personal computer.

In FIG. 3B, it is assumed that an operator moves the finger F in the right direction (X1) of the direction traversing the specific region 21 substantially in parallel or the direction inclined with respect to the right direction.

Figure 4:
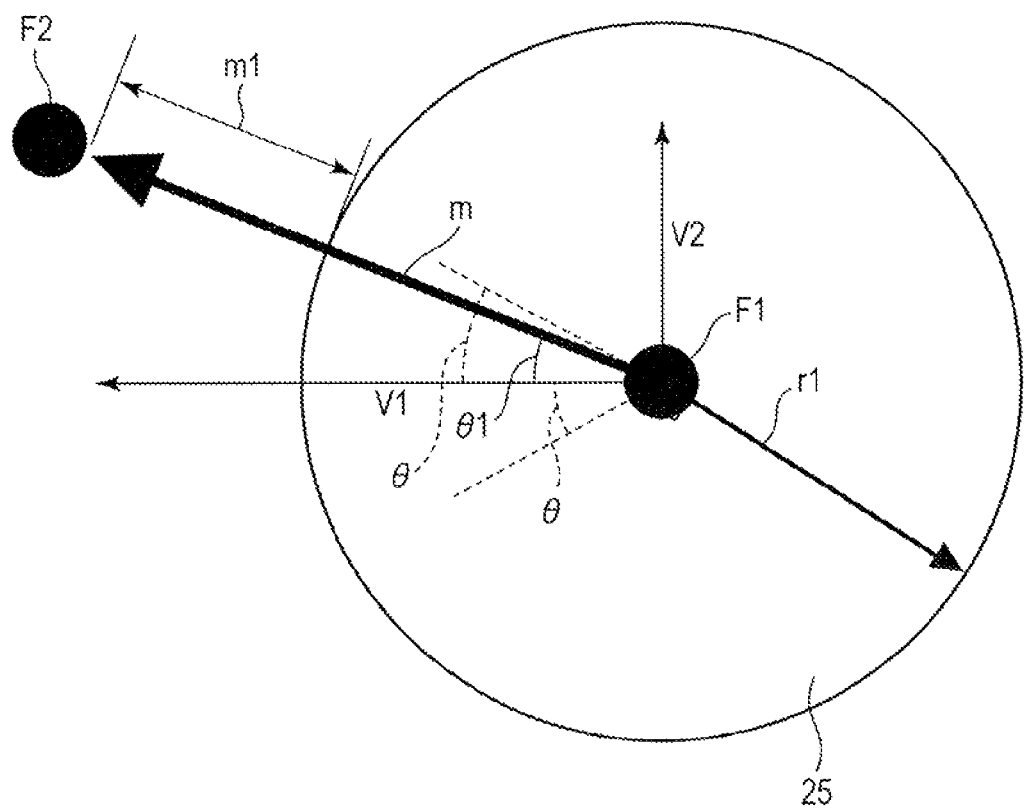
FIG. 4 is an enlarged plan view (schematic view) of the discrimination region shown in FIG. 3B.
Figure 4:
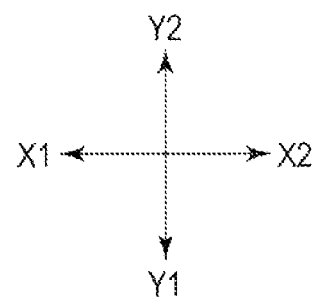

FIG. 4 is an enlarged view of the discrimination region 25 shown in FIG. 3B. As shown in FIG. 4, the operator moves the finger from an original operation position (base point F1) to a point (moving point) F2 that becomes a discrimination point.

At this time, in FIG. 4, a moving direction m of the finger from the base point F1 to the moving point F2 is positioned on the line inclined with respect to the direction, which is parallel to the direction traversing the specific region 21 (right direction X1), by an angle θ1. That is, the moving direction m is positioned on the line that obliquely traverses the specific region 21.

In this embodiment, the fact that the moving direction m of the finger from the base point F1 is positioned on the line traversing the specific region 21 substantially in parallel or obliquely when the finger (indicator) F moves within the discrimination region 25 as described above is used as a condition that allows a predetermined function to be performed on the display screen 6.

A discrimination unit (discrimination means) 13 of the controller 11 shown in FIG. 10 discriminates whether the moving direction m of the finger is positioned on the line traversing the specific region 21 substantially in parallel or obliquely. Since the XY coordinates of the moving point F2 can be found out by the detection unit 10, the moving direction m can be found out from the XY coordinates of the base point F1 and the moving point F2.

If the discrimination unit 13 discriminates that the condition is satisfied, a performance signal for allowing a predetermined function to be performed is generated by a signal generating unit 14 of the controller 11 and is sent to the apparatus main body 2.

Figure 12:
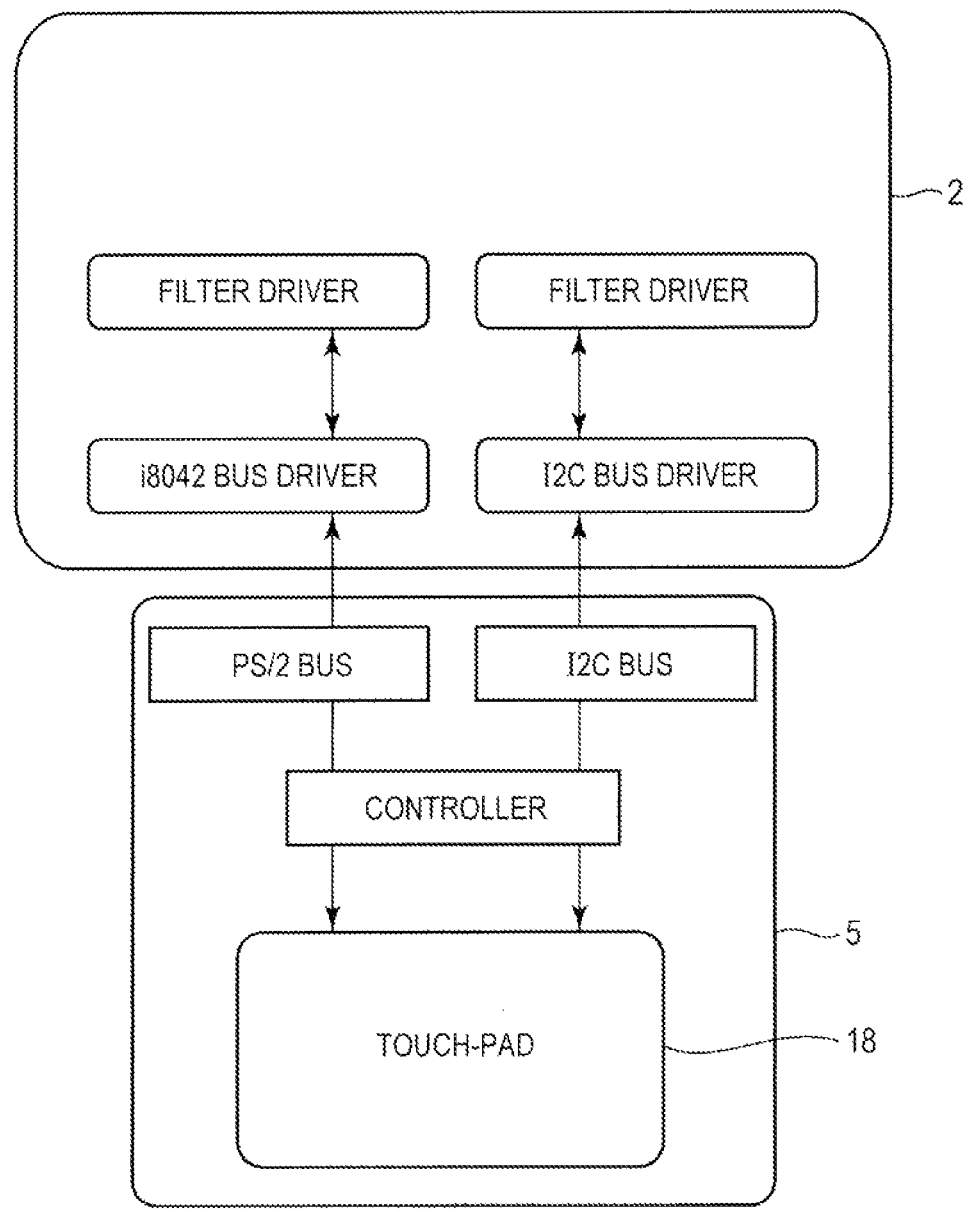
FIG. 12 is an example of a block diagram showing channels of the input device and an apparatus main body.
Figure 13A:
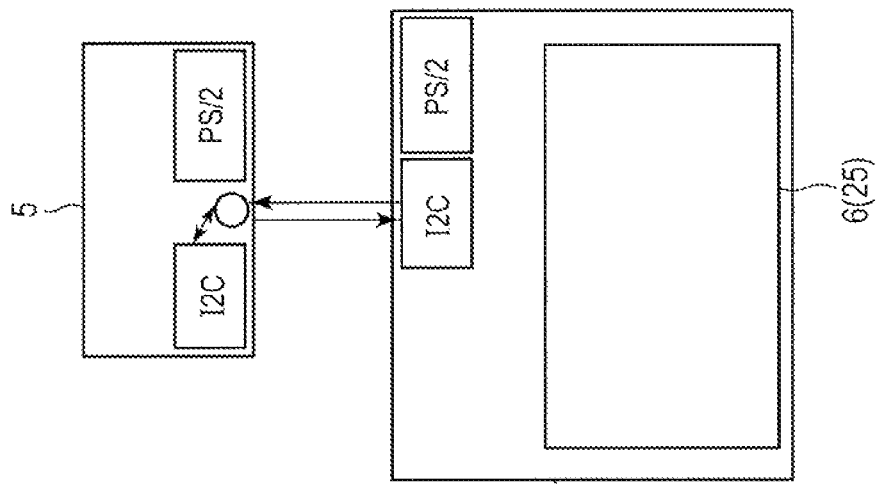
FIGS. 13A, 13B, and 13C are examples of a block diagram showing channels of the input device and the apparatus main body.
Figure 13B:
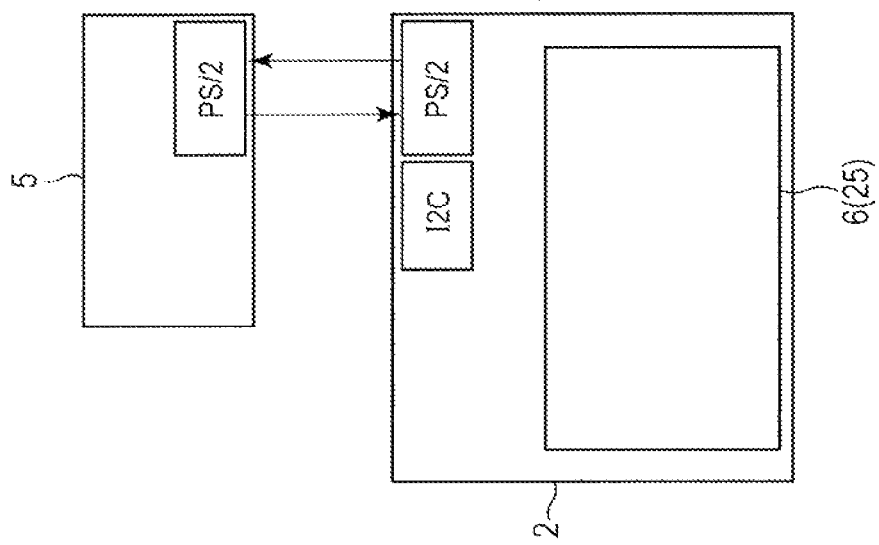
Figure 13C:
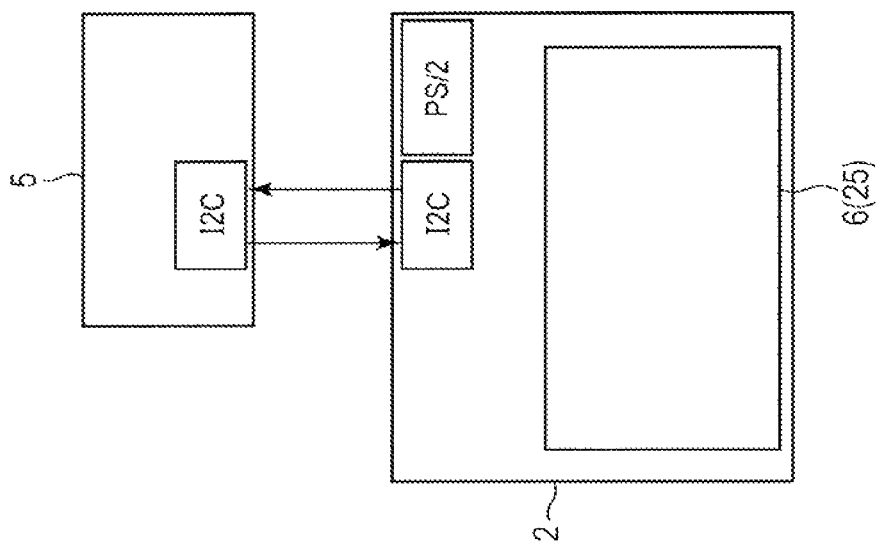

The performance signal is sent and received through, for example, channels shown in FIG. 12. As shown in, for example, FIG. 13, an I2C bus and a PS/2 connector are built in the apparatus main body 2 as an interface. However, in FIG. 13A, an I2C bus is built in the input device 5 and a signal can be sent and received through the I2C bus. Further, in FIG. 13B, a PS/2 connector is built in the input device 5 and a signal can be sent and received through the PS/2 connector. Furthermore, both an I2C bus and a PS/2 connector are used in the input device 5 in FIG. 13C and a signal is sent and received through the I2C bus in FIG. 13C. The I2C bus, the PS/2 connector, or both the I2C bus and the PS/2 connector are selected according to a signal. Meanwhile, the channels for a signal between the apparatus main body 2 and the input device 5 shown in FIGS. 12 and 13 are illustrative examples.

A display driver 27 is controlled by an operating system (OS) 26 built in the apparatus main body 2 as shown in FIG. 10, so that various kinds of information is displayed on the display screen 6 of the display device 38.

In this embodiment, for example, the specific region 21 created adjacent to the right end portion 7b of the input operation surface 7 is operated by the finger F; the discrimination region 25, which uses the operation position of the finger as the base point F1 as described with reference to FIGS. 3B and 4, is created by the region creating unit 12 of FIG. 10; and a performance signal is generated by the signal generating unit 14 when the discrimination unit 13 discriminates that the moving direction m in which the finger passes through the discrimination region 25 is the right direction (X1) traversing the specific region 21 or a direction obliquely traversing the specific region 21.

Figure 8A:
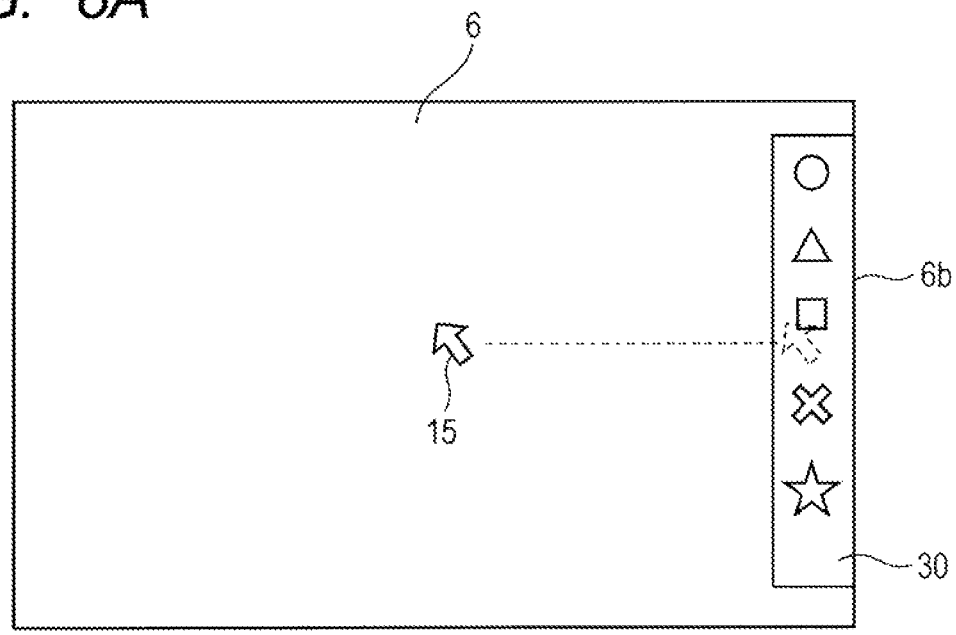
FIG. 8A is a schematic view showing an operation performed on the input device and FIG. 8B is a schematic view showing a state where a predetermined function accompanied by the operation is performed on a display screen.
Figure 8B:
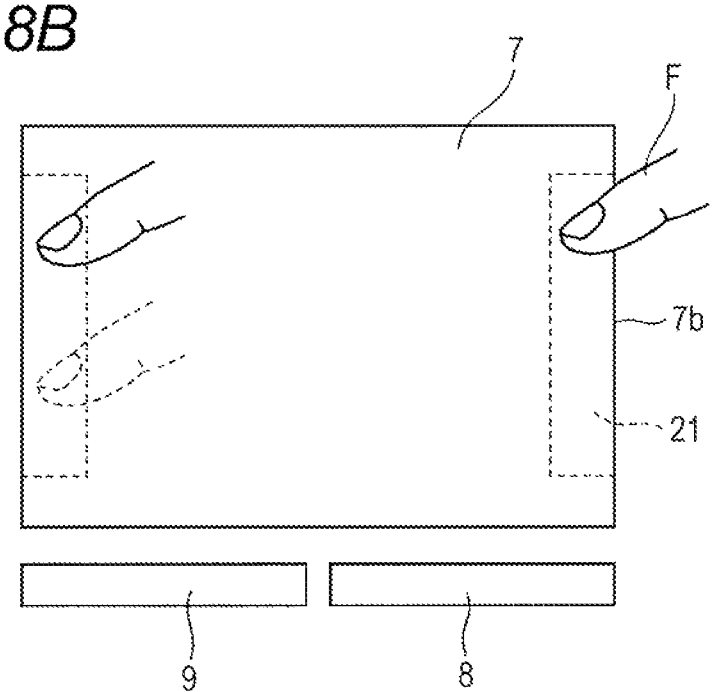

Further, a predetermined function, which displays (opens), for example, a menu screen 30 at the right end portion 6b of the display screen 6 as shown in FIGS. 8A-8B, is performed on the basis of the performance signal. A start menu and the like may be the menu screen 30. The menu screen is a screen on which switching icon images, windows, or the like are displayed on a screen achieving various functions on the display screen 6. Alternatively, the menu screen can display applications, windows, and the like or can start various displayed objects.

In this embodiment, it is possible to display the menu screen 30 on the basis of the operation of the finger in the specific region 21 regardless of the position of the cursor 15 displayed on the display screen 6 as shown in FIGS. 8A-8B. For example, the cursor 15 may be controlled so as to automatically move into the menu screen 30 when the menu screen 30 is displayed. An operator can easily select various icons or windows displayed in the menu screen 30.

Meanwhile, the fact that the moving direction m of the finger from the base point F1 is positioned on the line traversing the specific region 21 substantially in parallel or obliquely when the finger (indicator) moves within the discrimination region 25 has been used as the condition that allows a predetermined function to be performed. However, since it is possible to make the condition, which allows a predetermined function to be performed, be strict or relaxed by adding other conditions to the condition, it is possible to freely adjust sensitivity. Accordingly, it is possible to achieve operability suitable for an operator. Further, it is possible to suppress a malfunction by employing a plurality of conditions to be described below.

The following conditions can be set as discrimination conditions in the first embodiment shown in, for example, FIGS. 3 and 4.

First condition: when a movement vector from the base point F1 to the moving point F2 is divided into a parallel vector component v1 parallel to a direction (X1) that traverses the specific region 21 substantially in parallel and a vertical vector component v2 that is orthogonal to the traverse direction (X1), the parallel vector component v1 is larger than the vertical vector component v2.

The first condition means that the moving direction m is positioned on the line traversing the specific region 21 substantially in parallel or obliquely.

Second condition: the moving distance of the finger is a set threshold or more.

Here, the threshold may be set to the radius r1. That is, a fact that the moving point F2 comes out from the discrimination region 25 to the outside is used as a condition.

Third condition: an angle $\theta 1$ between the parallel vector component v1 (the direction parallel to the traverse direction (X1)) and the moving direction m is within a predetermined angle $\theta$.

In the first condition, the fact that the moving direction m is positioned on the line traversing the specific region 21 substantially in parallel or obliquely has been used as a condition. However, it is possible to reduce a malfunction by regulating the upper limit of an angle of movement in an oblique direction.

Fourth condition: the movement time, which is required for the finger to pass through the discrimination region 25, is a predetermined time T (msec) or more.

That is, an action very quickly moving the finger is defined as not an action that is to perform a predetermined function and an action that does not intend to perform a predetermined function but an erroneous operation of an operator.

Meanwhile, the movement time has been defined to be equal to or longer than a predetermined time T. However, for example, the movement time may be defined to be equal to or shorter than a predetermined time or may be defined within a predetermined time range that has a lower limit and an upper limit That is, the movement time is defined so that a predetermined function is performed when an indicator moves at a certain level of speed.

Fifth condition: a distance where the finger moves after passing through the discrimination region 25 is Z (count) or more. Here, a distance m1 between an intersection point, which is between the moving direction m and the outer periphery of the discrimination region 25, and the moving point F2 that becomes a discrimination point may be defined as the distance Z. Alternatively, when the finger moves further than the moving point F2, the distance Z may be measured at the position of the finger that moves further.

In the fifth condition, a fact that the finger is moved and operated to an appreciable extent is used as a condition.

Sixth condition: the acceleration of the finger from the base point F1 to the moving point F2 is within A (V/m). The lower limit of the acceleration may be defined and the lower and upper limits (range) of the acceleration may be defined as in the above-mentioned fourth condition. Meanwhile, acceleration may not be measured from the base point F1 and after the finger moves by a predetermined distance.

Seventh condition: the installation area of the finger is B (count) or more. That is, a predetermined function is defined to be performed only when the finger comes into contact with the operation surface, for example, while laid down on the operation surface without coming into contact with the operation surface at the end thereof or only when the finger is pressed against the operation surface so that the contact area of the finger is large.

Meanwhile, not only the lower limit of the installation area but also the upper limit of the installation area may be set.

Figure 5:
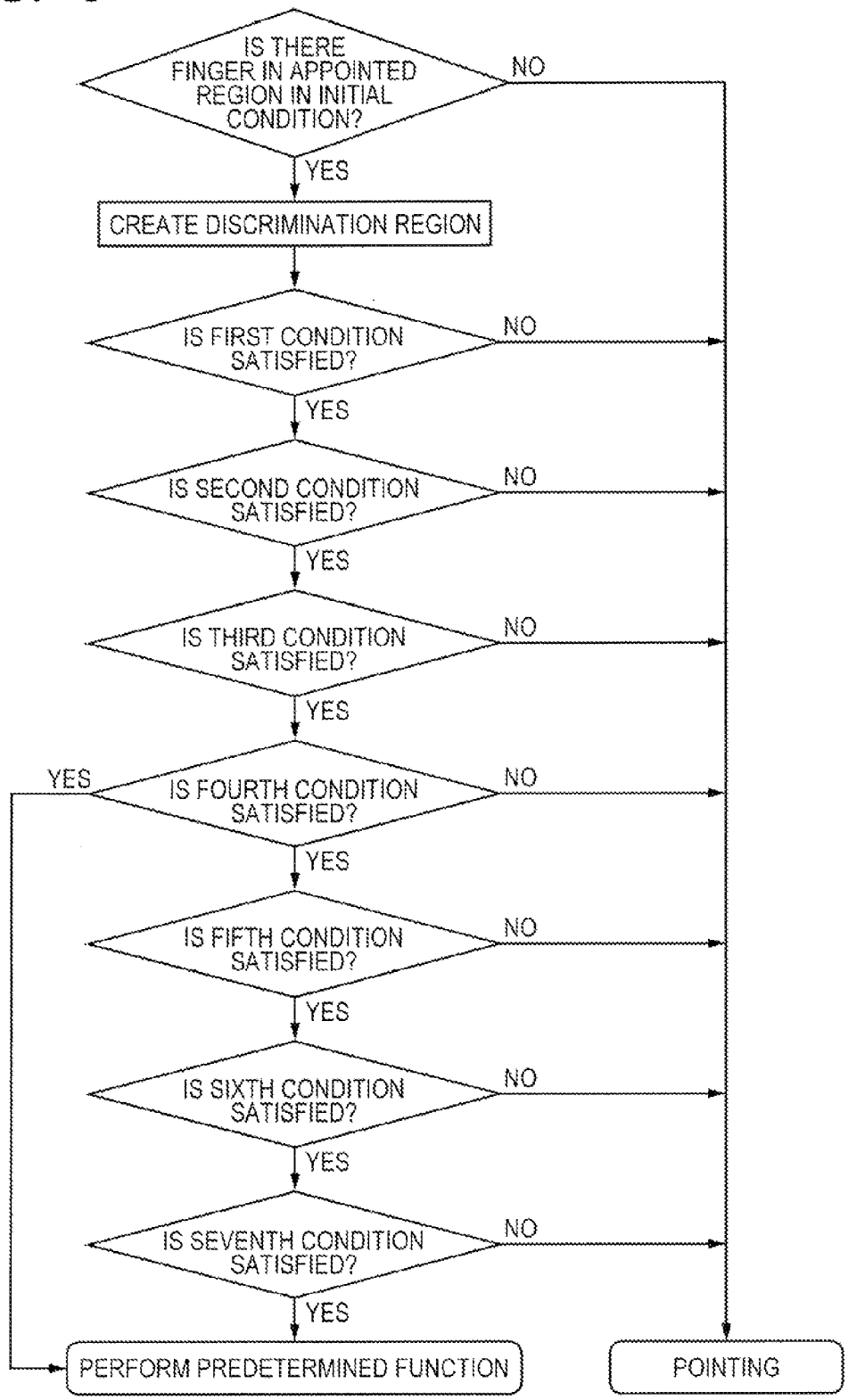
FIG. 5 is a flowchart illustrating conditions, which allow a predetermined function to be performed, of the input device according to the first embodiment.

As illustrated in a flowchart of FIG. 5, first, it is determined whether there is the finger (indicator) in the specific region 21 in an initial condition. If it is determined that there is no finger in the specific region 21, a pointing function is exhibited. Accordingly, it is possible to move the cursor 15 on the display screen 6 while interlocking the cursor with the movement of the finger.

If it is determined that the initial condition is satisfied, the region creating unit 12 of the controller 11 subsequently creates a circular discrimination region 25 while using the position of the finger as the base point F1. When the finger passes through the discrimination region 25 and moves to the moving point F2 becoming a discrimination point, the discrimination unit 13 of the controller 11 discriminates whether the above-mentioned first to seventh conditions are sequentially satisfied. If it is discriminated that all the first to seventh conditions are satisfied, the signal generating unit 14 of the controller 11 generates a performance signal that allows a predetermined function to be performed on the display screen 6 and sends the performance signal to the apparatus main body 2. The apparatus main body 2 performs a predetermined function, which displays (opens) the menu screen 30 on the display screen 6 as shown in, for example, FIGS. 8A-8B, on the basis of the performance signal.

As shown in FIG. 5, a pointing function is performed if any one of the first to seventh conditions is not satisfied.

Meanwhile, the order of the first to seventh conditions of FIG. 5 is an illustrative example. A manufacturer may change the setting of the order of the first to seventh conditions according to importance or the like, or the order of the first to seventh conditions may be adapted to be appropriately changed by an operator. Further, the order is not particularly defined, and whether the respective conditions are satisfied may be determined in a random order.

Furthermore, the satisfaction of all the first to seventh conditions may not be used as a condition that allows a predetermined function to be performed. For example, the first to fourth conditions may be used as essential conditions, and the fifth to seventh conditions may be used as selection conditions. In such a case, if at least the first to fourth conditions are satisfied, a predetermined function may be performed. Of course, only one of the first to seventh conditions may be used as an essential condition, but it is preferable that the essential conditions at least include conditions related to the distance and the angle defined in the first to third conditions.

Moreover, an operation may be performed by not only one finger but a plurality of fingers. For example, a control may be performed so that a predetermined function is performed when an operation is performed on both the specific regions 20 and 21 by fingers or a predetermined function is performed on the same specific region by the operation of a plurality of fingers. Meanwhile, the operation using a plurality of fingers can be performed in the same way even in FIGS. 6A-6B to be described below or other structures.

Figure 6A:
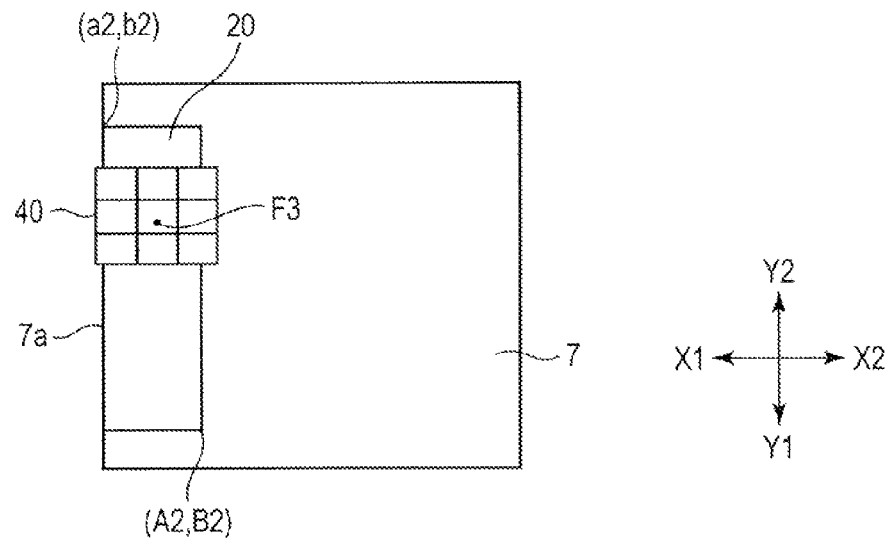
FIG. 6A-6B are a plan view of an input operation surface of an input device according to a second embodiment.
Figure 6B:
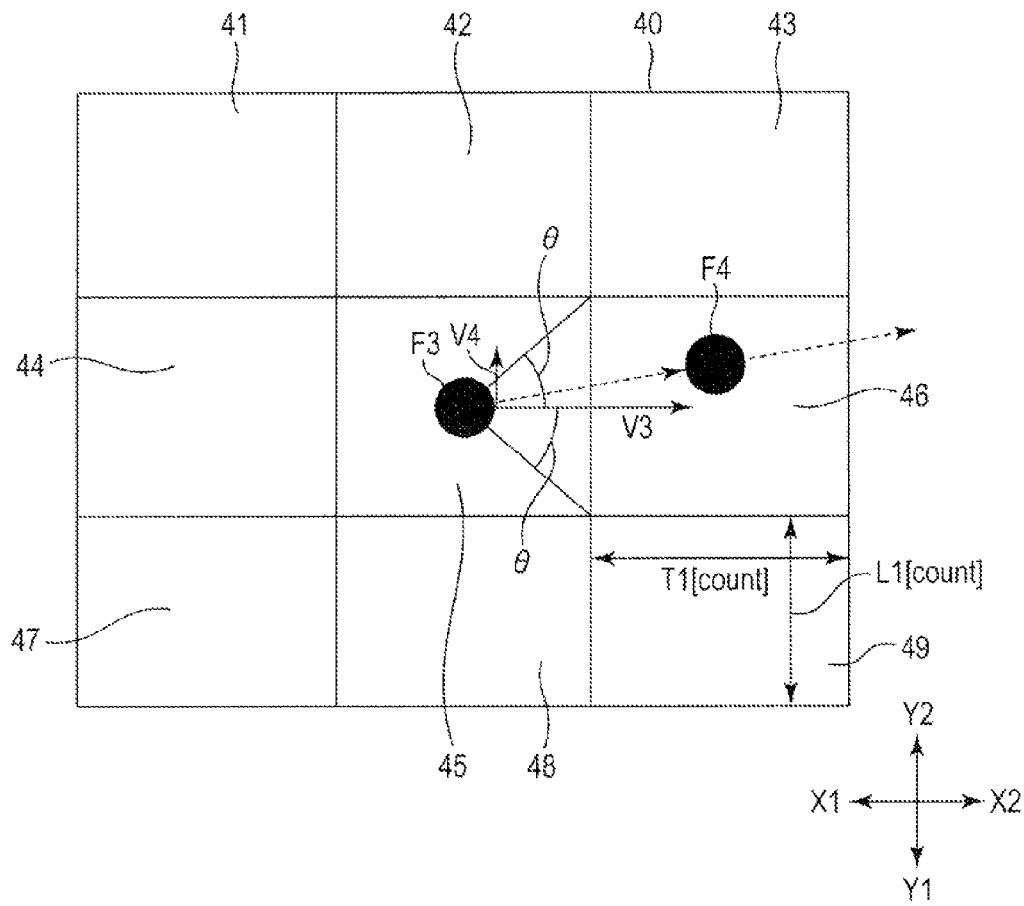

FIGS. 6A-6B are a plan view of an input operation surface of an input device according to a second embodiment, FIG. 6A is a plan view showing a state where a finger of an operator enters a specific region of the input operation surface, and FIG. 6B is a plan view showing a state where the detection of the presence of the finger in the specific region is received and a discrimination region is created.

A specific region 20 adjacent to a left end portion 7a of an input operation surface 7 is formed in FIG. 6A. The range of the specific region 20 is determined by the coordinates (a2, b2) and (A2, B2) of two apexes (corners) that are positioned on a diagonal line.

In FIG. 6A, a finger (indicator) is positioned in the specific region 20. F3 shown in FIG. 6A denotes the operation position of the finger, and the XY coordinates of the operation position F3 can be found out by the detection unit 10 shown in FIG. 10.

When it is detected that the finger is present in the specific region 20, the region creating unit 12 shown in FIG. 10 creates a discrimination region 40 while using the operation position F3 as a base point (which may be referred to as a base point F3 hereinafter).

As shown in FIG. 6B, the discrimination region 40 has a rectangular shape. As shown in FIG. 6B, the discrimination region 40 is divided into a plurality of small regions 41 to 49. The respective small regions 41 to 49 have the same rectangular shape.

The width of each of the small regions 41 to 49 in the left-and-right direction (X1-X2) is denoted by T1, and the length of each of the small regions 41 to 49 in the front-and-rear direction (Y1-Y2) is denoted by L.

As shown in FIGS. 6A-6B, the discrimination region 40 is divided into nine small regions 41 to 49. As shown in FIGS. 6A and 6B, the respective small regions 41 to 49 are disposed in a matrix form that has three rows and three columns.

As shown in FIG. 6B, the center of the first small region 45, which is disposed at the center of the discrimination region, of the respective small regions 41 to 49 is a base point F3. A right direction (X2) from the base point F3 is a direction that traverses the specific region 20 substantially in parallel, and a small region adjacent to the right side of the first small region 45 is referred to as a second small region 46.

In the second embodiment shown in FIGS. 6A-6B, conditions that allow a predetermined function to be performed on the display screen 6 are set, for example, as follows.

First condition: a moving point F4 is positioned in the second small region 46.

For the satisfaction of the first condition, when a movement vector from the base point F3 to the moving point F4 is divided into a parallel vector component v3 parallel to a direction (X2) that traverses the specific region 20 substantially in parallel and a vertical vector component v4 that is orthogonal to the traverse direction (X2), the parallel vector component v3 (the moving distance of the finger (indicator)) is T1/2 or more.

Further, the length L1 of each small region is adjusted. That is, if the length L1 is set to be long, the maximum approach angle θ where the finger (indicator) can enter the second small region 46 from the first small region 45 is increased. If the length L1 is set to be short, the maximum approach angle θ is reduced. Accordingly, it is possible to adjust the maximum approach angle θ by adjusting the length L1.

Second condition: the movement time required to detect the moving point F4, which is a discrimination point, from the base point F3 is a predetermined time W (msec) or more.

That is, an action very quickly moving the finger is defined as not an action that is to perform a predetermined function but an erroneous operation of an operator.

Meanwhile, the movement time has been defined to be equal to or longer than a predetermined time W. However, for example, the movement time may be defined to be equal to or shorter than a predetermined time or the lower and upper limits (range) of a predetermined time may also be defined. That is, the movement time is defined so that a predetermined function is performed when a finger (indicator) moves at a certain level of speed.

Meanwhile, the combination of the first and second conditions is the same as a case where the moving speed of the finger is used as a condition.

Third condition: a moving distance where the finger further moves from the moving point F4 is Z (count) or more.

In the third condition, a fact that the finger is moved and operated to an appreciable extent is used as a condition.

Fourth condition: the acceleration of the finger from the base point F3 to the moving point F4 is within A (V/m). The lower limit of the acceleration may be defined and the lower and upper limits (range) of the acceleration may be defined as in the above-mentioned second condition. Meanwhile, acceleration may not be measured from the base point F3 and after the finger moves by a predetermined distance.

Fifth condition: the installation area of the finger is B (count) or more. That is, a predetermined function is defined to be performed only when the finger comes into contact with the operation surface, for example, while laid down on the operation surface without coming into contact with the operation surface at the end thereof or only when the finger is pressed against the operation surface so that the contact area of the finger is large.

Meanwhile, not only the lower limit of the installation area but also the upper limit of the installation area may be set.

Figure 7:
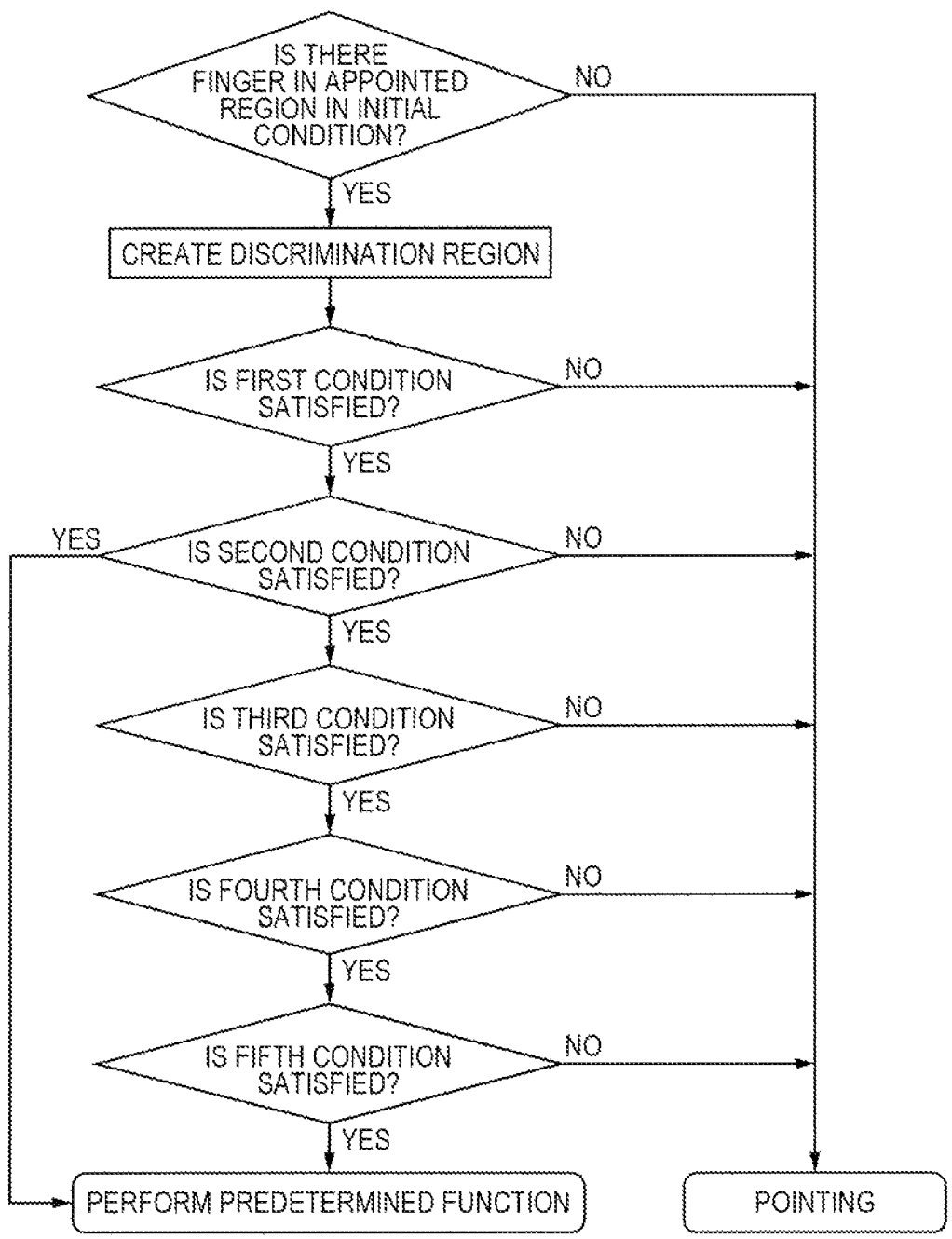
FIG. 7 is a flowchart illustrating conditions, which allow a predetermined function to be performed, of the input device according to the second embodiment.

As illustrated in a flowchart of FIG. 7, first, it is determined whether there is the finger (indicator) in the specific region 20 in an initial condition. If it is determined that there is no finger in the specific region 20, a pointing function is exhibited. Accordingly, it is possible to move the cursor 15 on the display screen 6 while interlocking the cursor with the movement of the finger.

If it is determined that the initial condition is satisfied, the region creating unit 12 of the controller 11 subsequently creates the rectangular discrimination region 40 that is divided into the plurality of small regions while using the position of the finger as the base point F3. When the finger passes through the discrimination region 40 and moves to the moving point F4 becoming a discrimination point, the discrimination unit 13 of the controller 11 discriminates whether the above-mentioned first to fifth conditions are sequentially satisfied. If it is discriminated that all the first to fifth conditions are satisfied, the signal generating unit 14 of the controller 11 generates a performance signal that allows a predetermined function to be performed on the display screen 6 and sends the performance signal to the apparatus main body 2. The apparatus main body 2 performs a predetermined function, which displays (opens) the menu screen 30 on the display screen 6 as shown in, for example, FIGS. 8A-8B, on the basis of the performance signal.

As shown in FIG. 7, a pointing function is performed if any one of the first to fifth conditions is not satisfied.

Meanwhile, the order of the first to fifth conditions of FIG. 7 is an illustrative example. A manufacturer may change the setting of the order of the first to fifth conditions according to importance or the like, or the order of the first to fifth conditions may be adapted to be appropriately changed by an operator.

Further, the satisfaction of all the first to fifth conditions may not be used as a condition that allows a predetermined function to be performed. For example, the first and second conditions may be used as essential conditions, and the third to fifth conditions may be used as selection conditions. In such a case, if at least the first and second conditions are satisfied, a predetermined function may be performed. Of course, only one of the first to fifth conditions may be used as an essential condition, but it is preferable that the essential conditions at least include conditions related to the distance and the angle defined in the first condition.

In this embodiment as described above, the specific region is set first in the input operation surface 7. Then, when it is detected that the finger (indicator) is present in the specific region, the discrimination region is created while the operation position of the finger (indicator) is used as a base point.

In this embodiment, as described above, a region (discrimination region) is newly created while the operation position of a finger (indicator) entering the specific region is used as a base point. Then, when a direction where the finger (indicator) moves in the discrimination region is a direction traversing the specific region substantially in parallel or obliquely, a predetermined function is performed.

Even though a finger (indicator) operates any portion of the specific region first in this embodiment, a discrimination region can be newly created while the operation position of the finger is used as a base point, and a predetermined function can be performed. Accordingly, it is possible to achieve simple operability. Further, it is possible to easily adjust the size of the discrimination region and the like and to freely and easily adjust the operation sensitivity that is required to perform a predetermined function. Furthermore, in this embodiment, a predetermined function is not performed even though the indicator is moved in any direction within the discrimination region. Moreover, a fact that the indicator moves in the direction traversing the specific region substantially in parallel or obliquely has been used as a condition that allows a predetermined function to be performed on the display screen. Accordingly, it is possible to suppress a malfunction and an operator easily and intuitively performs an operation in the direction traversing the specific region. Therefore, according to this embodiment, it is possible to improve operability, which is required to perform a predetermined function, as compared to the past.

In this embodiment, it is preferable that the specific regions 20 to 23 be provided adjacent to at least one of the left end portion 7a, the right end portion 7b, the front end portion 7c, and the rear end portion 7d of the input operation surface 7 as shown in FIG. 2. Since the specific regions 20 to 23 are provided adjacent to the respective end portions (sides) of the input operation surface as described above, it is possible to form the specific regions 20 to 23 of which the lengths are long along the end portions (sides). For example, the specific regions may be set only at the corners of the input operation surface 7, but it is difficult to obtain smooth operability in such a case. Since the specific regions are set along the end portions of the input operation surface 7 as shown in FIG. 2, it is possible to form elongated rectangular specific regions. As a result, it is easy to perform an operation. Further, since the specific regions 20 to 23 are formed along the end portions of the input operation surface 7, an operator easily and intuitively recognizes the direction that traverses the specific regions 20 to 23 substantially in parallel. Accordingly, it is possible to effectively improve operability.

Furthermore, in this embodiment, the discrimination regions 25 and 40 may be formed so as to partially protrude from the specific regions 20 and 21 in the directions traversing the specific regions 20 and 21 substantially in parallel as shown in FIGS. 3B and 6A. However, this means that the shapes or areas of the discrimination regions 25 and 40 do not depend on the shapes of the specific regions 20 and 21, and the discrimination regions should not necessarily protrude from the specific regions 20 and 21.

That is, in this embodiment, first, the fact that there is a finger (indicator) in the specific region as an initial condition is used as a condition that allows a predetermined function to be performed on the display screen 6. However, the operation position (base point) of the finger may be positioned near the end of the specific region. In such a case, if the formation range of the discrimination region is defined to be in the specific region, the discrimination region becomes very small. For this reason, it is difficult to determine whether a condition allowing a predetermined function to be performed is satisfied. Accordingly, in this embodiment, the discrimination regions are formed so as to have a predetermined area (size) without depending on the shapes or areas of the specific regions, regardless of the positions of the base points. In this case, if the discrimination regions 25 and 40 are allowed to partially protrude from the specific regions, it is possible to obtain stable discrimination accuracy.

Further, it is preferable that the discrimination regions 25 and 40 are formed in a shape surrounding the base points F1 and F3 as shown in FIGS. 3B, 4, and 6. Accordingly, even though there is the operation instability of an operator, the finger (indicator) does not suddenly come out from the discrimination region to the outside and the indicator is operated within the discrimination region. Therefore, the discrimination unit 13 can discriminate whether the operation state of the finger allows a predetermined function to be appropriately performed. As a result, it is possible to improve operability. At this time, it is preferable that the base points F1 and F3 be positioned at the centers of the discrimination regions 25 and 40. It is possible to easily create the discrimination regions 25 and 40 by drawing the discrimination regions 25 and 40 while using the base points as the centers.

Figure 11A:
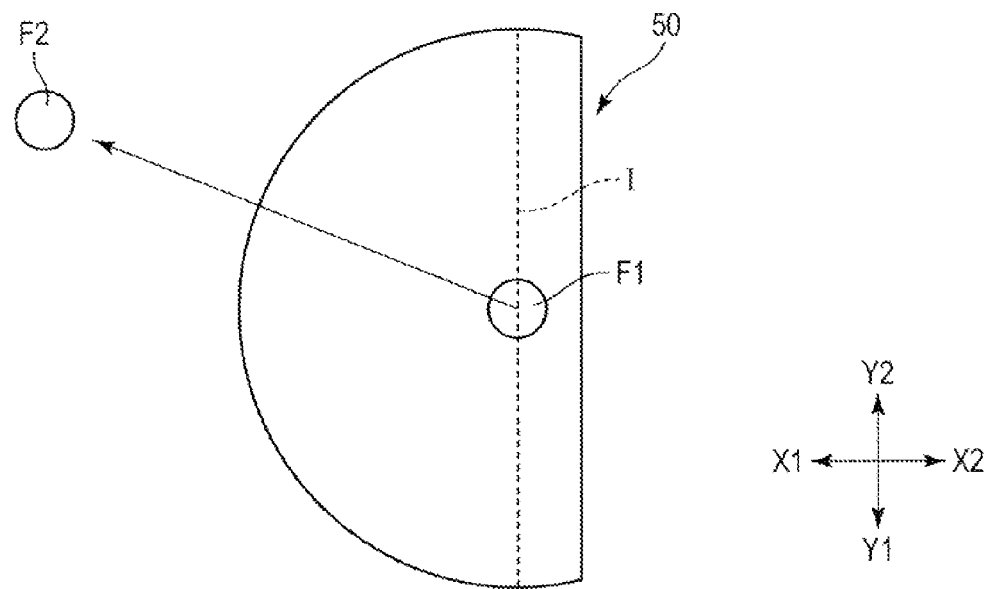
FIGS. 11A and 11B are plan views of discrimination regions of which the shapes are different from the shape of the discrimination region shown in FIG. 4 or FIG. 6B.

However, as in discrimination regions 50 and 52 shown in FIG. 11, regions of the discrimination regions opposite to the base points F1 and F3 in the directions, which traverse the specific regions 20 and 21 substantially in parallel, may be removed. The discrimination region 50 shown in FIG. 11A is the discrimination region 25 of FIG. 4 of which the region corresponding to the right side (X2) has been removed. The base point F1 is positioned in the discrimination region 50 that is surrounded by a solid line of FIG. 11A. However, the discrimination region may be a semicircular discrimination region 50 where the base point F1 is positioned on a diameter (on a dotted line I). The reason for this is that the moving point F2 becoming a discrimination point is necessarily positioned on the right side (X1) of the base point F1.

Figure 11B:
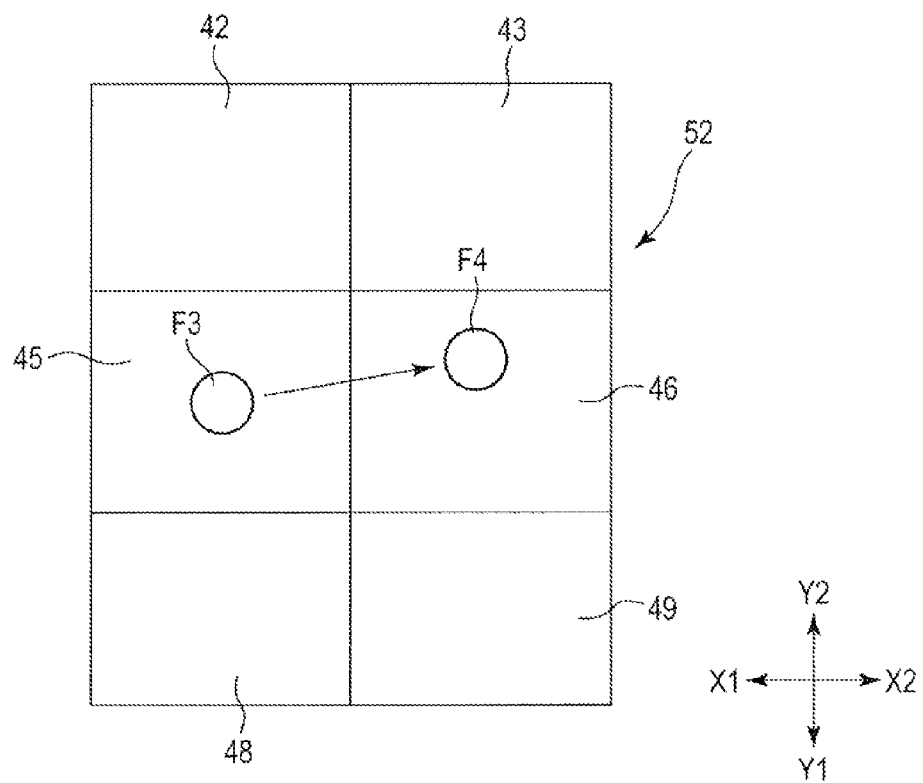

The small regions 41, 44, and 47 of a left column shown in FIG. 6B are removed in FIG. 11B.

Meanwhile, when the base points F1 and F3 are positioned at the centers of the discrimination regions 25 and 40 as shown in FIGS. 4 and 6B, it is possible to use traversing the specific regions substantially in parallel or obliquely as a condition allowing a first predetermined function to be performed, and to use, for example, the opposite regions in the directions, which traverse the specific regions substantially in parallel or obliquely, as a condition that allows a second predetermined function separate from the first predetermined function to be performed in addition to the traversing. Accordingly, it is possible to perform and select a plurality of functions using the discrimination regions.

In this embodiment, the discrimination region may be formed in a circular shape shown in FIG. 4, a rectangular shape shown in FIGS. 6A-6B, or the like. If a radius r1 is set when the discrimination region is formed in a circular shape, it is possible to easily create the discrimination region 25. When the discrimination region is formed in a rectangular shape in this embodiment, a fact that the plurality of small regions are formed and the finger (indicator) moves from the first small region 45 in which the base point F3 is positioned to the second small region 46, which is adjacent to the first small region 45 in the direction traversing the specific region 20, is used as a condition. However, when the discrimination region is formed in a circular shape, the discrimination region is not divided into a plurality of small regions. For example, if the moving direction of the finger from the base point F1 is a moving direction corresponding to the radius R1 or more in any direction when the discrimination region is formed in a circular shape and the coming of a finger (indicator) from the circular discrimination region to the outside is used as a condition, the finger comes out from the discrimination region to the outside. Accordingly, it is possible to obtain stable sensitivity. Meanwhile, when the discrimination region is formed in a rectangular shape, a distance where the finger comes out from the rectangular discrimination region to the outside is changed due to the inclination of the moving direction of the finger from the base point F3. Accordingly, a difference in sensitivity is apt to occur. Therefore, when the discrimination region is formed in a rectangular shape, it is possible to reduce sensitivity variation by dividing the discrimination region into the plurality of small regions as shown in FIGS. 6 and 11B and determining the moving state of the finger between the respective small regions.

In this embodiment, a fact that the moving direction of the finger, when the finger (indicator) moves within the discrimination region, is positioned on at least a line, which traverses the specific region substantially in parallel or obliquely, is used as a condition in order to allow a predetermined function to be performed on the display screen 6.

In this embodiment, a fact that the finger (indicator) moves from the base point by a predetermined distance or more, time that is required to reach the predetermined distance, the moving speed of the finger (indicator), a fact that the moving direction of the finger (indicator) is within a predetermined angle 8 from the direction traversing the specific region substantially in parallel, the moving distance where the finger (indicator) moves after passing through the discrimination region, the acceleration of the finger (indicator), or the like may be added as one of the conditions in addition to the above-mentioned condition. It is possible to suppress a malfunction by using a plurality of conditions that allow a predetermined function to be performed as described above. Further, since it is possible to make a condition, which allows a predetermined function to be performed, be strict or relaxed by combining the conditions, it is possible to freely adjust operation sensitivity. Accordingly, it is possible to achieve operability suitable for an operator.

In this embodiment, a "predetermined function" that is displayed on the display screen 6 and performed, when a finger is positioned in the specific region and terms and conditions are satisfied about the discrimination region created on the basis of the position of the finger, is not limited to a certain function. However, it is preferable to perform the predetermined function at a position, which corresponds to the specific region where the operation position of the finger (indicator) is detected, on the display screen. That is, when the specific region 20 positioned at the right end portion 7b of the input operation surface 7 is operated by the finger F, the start of a predetermined function near the right end portion 6b of the display screen 6 as shown in FIGS. 8A-8B is suitable to allow an operation to be easily and intuitively recognized.

Further, after the predetermined function is performed, another function may be achieved through the detection of the fact that the finger (indicator) is positioned on the specific region. For example, after a predetermined function is performed at a right end specific region, still another function can be performed when the finger is moved to a left end specific region.

For example, in FIGS. 8A-8B, after the menu screen 30 is displayed, it is possible to perform a function of moving the cursor 15 into the menu screen 30 on the assumption that the finger F is still positioned in the specific region 21.

Alternatively, a case where the finger moves by a predetermined distance or more, a case where the finger moves at a set angle, a case where the finger moves at a predetermined speed (all the cases show the moving state of the finger (indicator)), a case where a predetermined time has passed, a case where a plurality of fingers come into contact with the input operation surface, and the like may be used as the trigger of the performing of the above-mentioned another function.

Figure 9A:
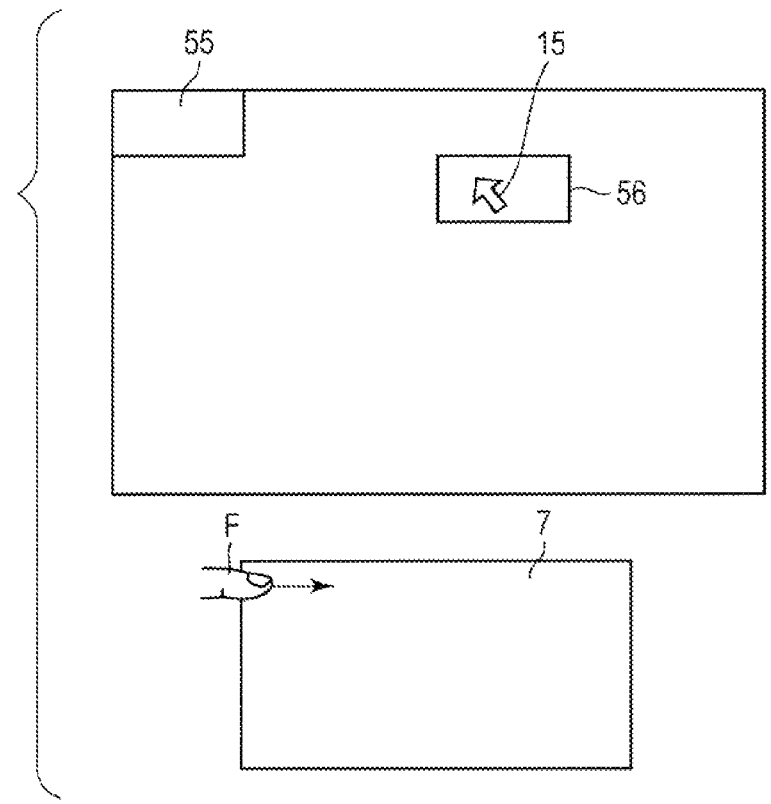
FIG. 9A is a schematic view showing an operation performed on the input device, and a state where a predetermined function accompanied by the operation is performed on the display screen.
Figure 9B:
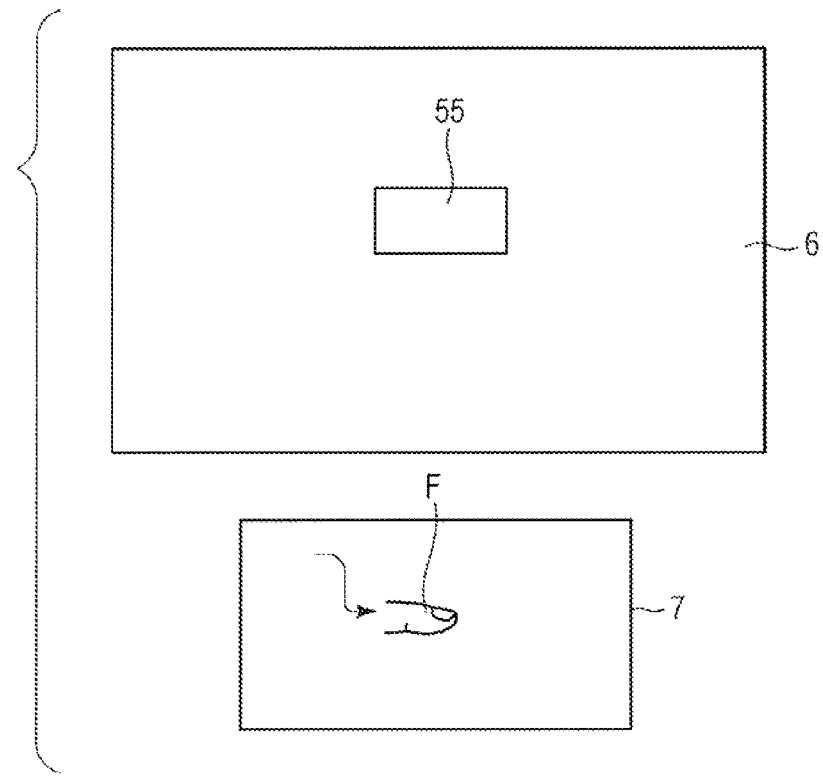
FIG. 9B is a schematic view showing an action after the decision of a predetermined function.

Further, after a predetermined function of displaying a displayed object 55, such as an application or a window, on the display screen 6 by the operation of the finger F in the direction of an arrow on the input operation surface 7 as shown in FIG. 9A is performed, the displayed object 55 may be dragged by one finger as shown in FIG. 9B by the continuous output of a down signal that allows the left button 9 to be pressed while the finger F comes into contact with the input operation surface 7. At this time, as a method of selecting a displayed object, a displayed object 56 positioned below the cursor 15 as shown in FIG. 9A may be selected and a preregistered displayed object 56 may be selected.

It should be understood by those skilled in the art that various modifications, combinations, sub-combinations and alterations may occur depending on design requirements and other factors insofar as they are within the scope of the appended claims of the equivalents thereof.

What is claimed is:

1. An input device comprising:
    an input operation surface provided separately from a display screen, the input operation surface including at least one specified region and being configured to be operated by an indicator;
    a detection unit configured to detect an operation position of the indicator placed on the input operation surface;
    a region creating unit configured to create a discrimination region if the operation position is detected within the specified region, the detected operation position being a base point for creating the discrimination region;
    a discrimination unit configured to discriminate for a condition for performing a predetermined function on the display screen, by determining if a moving direction of the indicator from the base point to a moving point through the discrimination region is substantially in parallel or oblique to a traversing direction traversing the specified region, the traversing direction being substantially in parallel to a selected direction associated with the specified region,
    a signal generating unit configured to output a performance signal if the discrimination unit discriminates that the condition is satisfied, the performance signal allowing the predetermined function to be performed.

2. The input device according to claim 1, wherein the input operation surface includes:
    a left edge portion and a right edge portion, parallel to each other, and
    a front edge portion and a rear edge portion parallel to each other, the front edge portion and the rear edge portion being orthogonal to the left edge portion and the right edge portion,
    wherein the specified region is provided adjacent to at least one of the left edge end portion, the right edge portion, the front edge portion, and the rear edge portion,
    the traversing direction of the specified region adjacent to the left edge portion is substantially in parallel to a right direction,
    the traversing direction of the specified region adjacent to the right edge portion is substantially in parallel to a left direction,
    the traversing direction of the specified region adjacent to the front edge portion is substantially in parallel to a rearward direction, and
    the traversing direction of the specified region adjacent to the rear edge portion is substantially in parallel to a forward direction.

3. The input device according to claim 1, wherein a shape of the discrimination region does not depend on a shape and an area of the specified region.

4. The input device according to claim 1, wherein the discrimination region has a boundary surrounding an area including the base point.

5. The input device according to claim 4, wherein the base point is positioned at a center of the discrimination region.

6. The input device according to claim 4, wherein the discrimination region is created in a circular shape.

7. The input device according to claim 4, wherein the discrimination region is formed in a rectangular shape.

8. The input device according to claim 1, wherein the discrimination unit further determines if a distance that the indicator travels from the base point is equal to or greater than a predetermined distance.

9. The input device according to claim 8, wherein the discrimination unit further determines a time period required for the indicator to travel the predetermined distance.

10. The input device according to claim 1, wherein the discrimination unit further determines a moving speed of the indicator.

11. The input device according to claim 1, wherein discrimination unit further determines if the moving direction of the indicator is within a predetermined angle θ from the traversing direction of the specified region.

12. The input device according to claim 1, wherein discrimination unit further determines a moving distance of the indicator after passing through the discrimination region.

13. The input device according to claim 1, wherein the discrimination region is divided into a plurality of sub-regions, and
    wherein the discrimination unit further determines if the indicator moves from a first sub-region in which the base point is positioned to a second sub-region adjacent to the first sub-region in the traversing direction of the specified region.

14. The input device according to claim 1, wherein the discrimination unit further determines an acceleration of the indicator.

15. The input device according to claim 1, wherein the region creating unit creates the discrimination region in a circular shape, and a movement vector of the indicator is defined from the base point to the moving point, the movement vector having a parallel vector component parallel to the traversing direction and a vertical vector component orthogonal to the traversing direction, and wherein the discrimination unit further determines:
- if the parallel vector component is greater than the vertical vector component,
- if the moving distance of the indicator is equal to or greater than a predetermined value,
- if an angle θ1 of the movement vector from the traversing direction is within a predetermined angle θ, and
- time period for the indicator to pass through the discrimination region.

16. The input device according to claim 15,
wherein the discrimination unit further determines at least one of:
a moving distance of the indicator after passing through the discrimination region;
an acceleration of the indicator to the moving point; and
a contact area of the indicator with the input operation surface.

17. The input device according to claim 15,
wherein the discrimination region of the circular shape has a radius r1 with the base point as a center, and the predetermined value of the moving distance of the indicator is the radius r1.

18. The input device according to claim 1,
wherein the region creating unit divides the created discrimination region into a plurality of sub-regions so that the discrimination region includes at least a first sub-region including the base point as a center thereof and a second sub-region positioned adjacent to the first sub-region in the traversing direction of the specified region, and
wherein the discrimination unit further determines if the moving point of the indicator is positioned in the second sub-region, and movement time for the indicator to travel from the base point to the moving point.

19. The input device according to claim 18,
wherein each of the sub-regions has a width T1 in the traversing direction of the specified region and a length L1 in a direction orthogonal to the traversing direction, the region creating unit adjusts the width T1 and the length L1 so that an maximum angle of the moving direction with respect to the traversing direction becomes equal to or smaller than a predetermined angle θ when the indicator moves to the second sub-region from the base point in the first sub-region.

20. The input device according to claim 18,
wherein the discrimination unit further determines at least one of:
an acceleration of the indicator moving from the base point to the moving point;
another moving distance of the indicator when the indicator further moves from the moving point; and
a contact area of the indicator with the input operation surface.

21. The input device according to claim 18,
wherein the region creating unit creates the respective sub-regions in a same rectangular shape and disposes the plurality of sub-regions in a matrix form.

22. The input device according to claim 1,
wherein an operation performed on an unspecified region of the input operation surface other than the specified region is associated with a cursor displayed on the display screen.

23. The input device according to claim 1,
wherein the performance signal allows the predetermined function to be performed at a position on the display screen corresponds to the specified region in which the operation position of the indicator is detected.

24. The input device according to claim 1,
wherein another function is performed if the detection unit detects the operation position of the indicator on the specified region after the predetermined function is performed.

25. The input device according to claim 1,
wherein after the predetermined function is performed, another function is performed if the detection unit detects a predetermined moving state of the indicator.

26. The input device according to claim 23,
wherein the predetermined function is to display or start a menu screen, an application, or a window on the display screen.

27. An electronic apparatus comprising:
the input device according to claim 1;
an apparatus main body configured to receive the performance signal from the input device; and
a display device that includes the display screen.

* * * * *